United States Patent

[11] 3,602,920

[72] Inventors John W. Davis;
　　Olen E. Hill, both of Huntsville, Ala.
[21] Appl. No. 889,557
[22] Filed Dec. 31, 1969
[45] Patented Sept. 7, 1971
[73] Assignee The United States of America as represented by the Administrator of the National Aeronautics and Space Administration

[54] WIND TUNNEL TEST SECTION
　　5 Claims, 5 Drawing Figs.
[52] U.S. Cl. .................................................. 73/147
[51] Int. Cl. ..................................................... G01m 9/00
[50] Field of Search .......................................... 73/147

[56] References Cited
UNITED STATES PATENTS
2,729,974　1/1956　Lee et al. ..................... 73/147

2,861,419　11/1958　Hausman ..................... 73/147 UX
3,027,760　4/1962　Holderer ..................... 73/147

Primary Examiner—S. Clement Swisher
Attorneys—L. D. Wofford, Jr., W. H. Riggins and G. T. McCoy ABSTRACT: A test section for use in a short duration wind tunnel capable of simulating very high Reynolds numbers over the transonic speed range. An exterior circular tube contains a perforated concentrically disposed sleeve assembly forming an annular flow plenum between the exterior tube and the sleeve assembly. The main flow stream through the wind tunnel is through the sleeve assembly with "sucking off" from the main flow stream occurring through the holes in the walls of the sleeve assembly into the plenum. Flow into the plenum is adjustable to obtain the desired main stream flow velocity and the optimum cancellation of shock and expansion waves produced when the gas flow strikes the test model in the test section. The plenum flow is controlled by a rotatable ring at the downstream end of the test section.

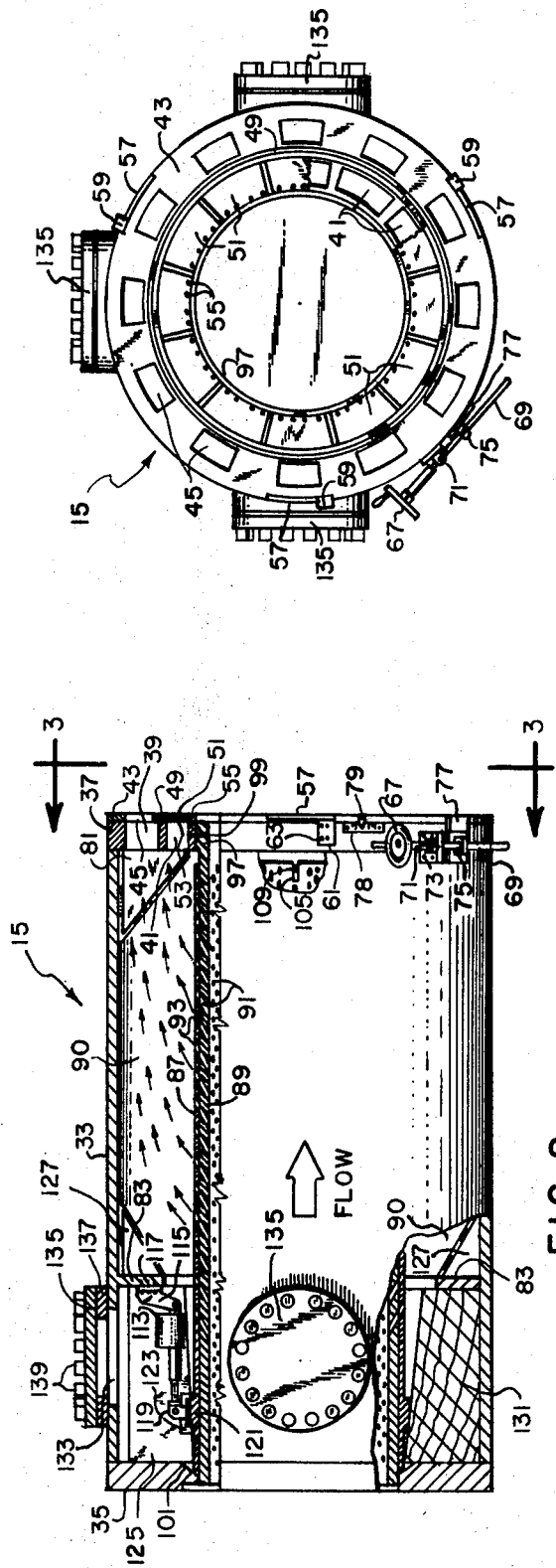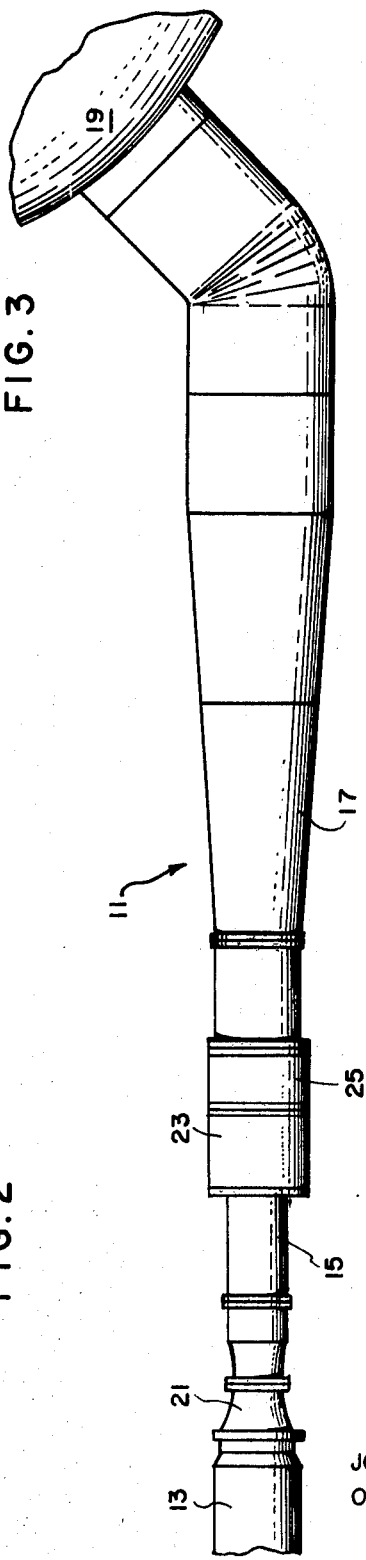

PATENTED SEP 7 1971 3,602,920

JOHN W. DAVIS
OLEN E. HILL
INVENTORS

BY
ATTORNEYS 3,602,920

WIND TUNNEL TEST SECTION

ORIGIN OF THE INVENTION

The invention described herein was made by employees of the U.S. Government and may be manufactured and used by or for the U.S. Government for governmental purposes without the payment of any royalties thereon or therefor.

BACKGROUND OF THE INVENTION

This invention relates generally to wind tunnels and more particularly to a transonic test section of a wind tunnel.

Of major importance in the successful development of aircraft and space vehicles is the development of simulation facilities for subjecting test objects to actual flight aerodynamic conditions. Wind tunnels of various types are commonly used for producing the aerodynamic conditions in which test models of flight vehicles are mounted for testing. The development of very large rocket vehicles has introduced problems in producing wind tunnel simulation for test models due to the great size of the vehicles and the extremely high Reynolds number simulation parameters required. With the aim of minimizing costs and emphasizing simplicity a short duration wind tunnel facility has been developed which is capable of producing the Reynolds numbers required for simulation with test models of very large rocket vehicles. This facility must generate unusually high pressure in the test section of the wind tunnel in order to produce the required Reynolds numbers and to compensate for a greater scaling down of the test model required relative to test models of smaller aerospace vehicles.

Another aspect in the success of the short duration wind tunnel in the testing of large rocket vehicles is the production of the desired flow velocity in the test section of the tunnel. Experimentation has shown that obtainment of transonic flow velocities in the test section is more difficult than obtaining subsonic or supersonic flow. In addition to the above considerations it is also necessary to provide a means in the test section for cancelling shock and expansion waves that develop when the test medium strikes the test model so that these waves will not rebound from the wall of the test section against the test model thus impairing the simulation. It is, therefore, apparent that the test section is a critical component of a short duration wind tunnel which is capable of adequately simulating aerodynamic flight conditions for very large rocket vehicles.

SUMMARY OF THE INVENTION

The invention comprises a transonic test section for a short duration wind tunnel capable of producing extremely high Reynolds numbers in the transonic range. The test section comprises an exterior circular tube in which is concentrically mounted a circular sleeve assembly including an inner and outer sleeve. The main flow stream of the test section is through the diameter of these sleeves and the test model is disposed in this region of the test section. The sleeves are of a substantially less diameter than the exterior tube such that an annular plenum space is formed between the sleeve assembly and the exterior tube. The sleeves are each perforated and one sleeve is slidable longitudinally relative to the other sleeve so that the amount of flow space through the holes in the sleeves and into the plenum may be adjusted by an actuator for sliding one of the sleeves.

The downstream end of the test section incorporates means for adjusting the flow space for flow out of the plenum and into the adjacent section of the wind tunnel. Thus the flow of the test medium from the main stream into the plenum through the holes in the sleeve walls and out of the plenum at the downstream end of the test section may be finely adjusted to produce the desired flow velocity in the main stream and effect an optimum cancellation of shock and expansion waves in the main stream region such that they do not reflect back to the test model.

Accordingly it is a general object of the present invention to provide a transonic test section for a short duration wind tunnel.

A more specific object of the invention is to provide a circular test section for a short duration wind tunnel which test section is capable of withstanding higher pressures than prior test sections.

Another object of the invention is to provide a test section for a short duration wind tunnel that functions to provide extremely high Reynolds numbers in the test section.

Another object of the invention is to provide a test section for a short duration wind tunnel that is capable of varying the flow Mach number through the test section.

Another object of the invention is to provide a test section for a short duration wind tunnel that has adjustable means for providing optimum cancellation of shock and expansion waves in the main stream region of the test section.

These and other objects and advantages of the invention will become apparent upon reference to the following specification, attendant claims and drawing.

BRIEF DESCRIPTION OF THE DRAWING

FIG. 1 is a side view schematically illustrating certain adjoining components of a short duration wind tunnel, one of these components being a test section of the present invention;

FIG. 2 is a side view of a test section embodying the present invention partially in section and partially broken away;

FIG. 3 is an end view of the test section of FIG. 2 showing the downstream end of the test section taken along lines 3—3 of FIG. 2;

DESCRIPTION OF THE PREFERRED EMBODIMENT

Figure 4:
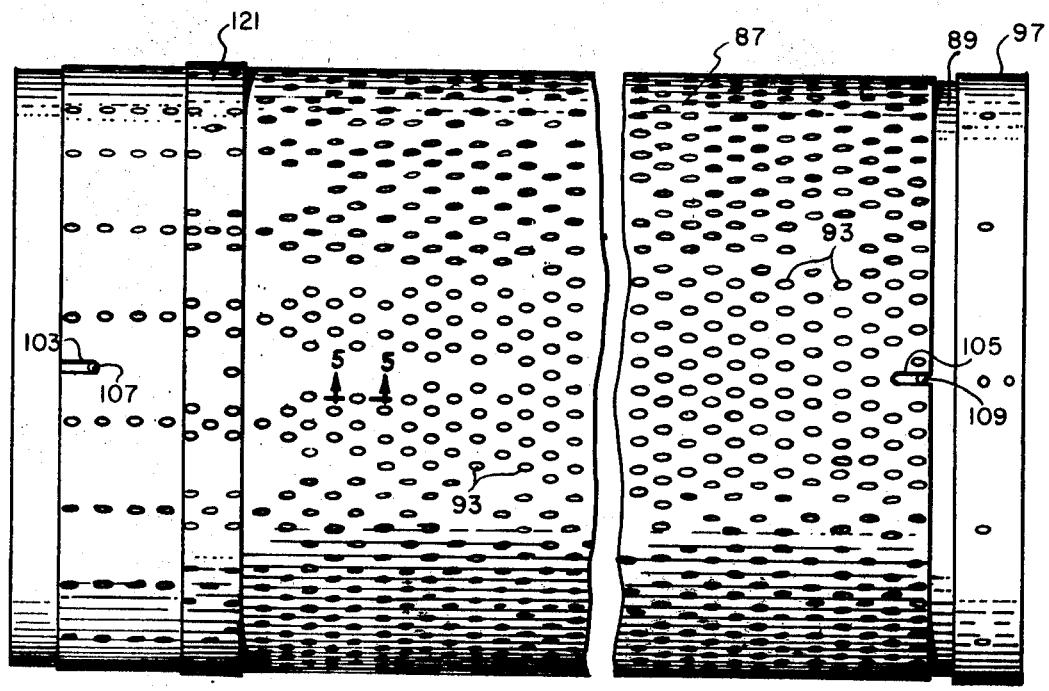
FIG. 4 is an enlarged side view of a sleeve assembly incorporated in the test section of FIGS. 2 and 3.
Figure 5:
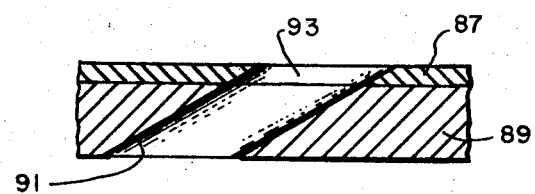
FIG. 5 is an enlarged cross-sectional view taken along line of 5—5 of FIG. 4 showing the slanted holes in the walls of the sleeve assembly.

Referring to FIG. 1, therein is schematically shown a short duration wind tunnel 11 the most pertinent components of which are a supply tube section 13, a test section 15 and a diffuser section 17 that extends into a spherical exhaust tank, a portion of which is indicated at 19. Between the supply tube 13 and the test section 15 is a nozzle 21 and immediately downstream of the test section 15 is a test model mounting section 23. Between the model-mounting section 23 and the diffuser section 17 is a burst diaphragm flow initiator 25. The identified components of the wind tunnel 11 will not be described in detail except the test section 15 that embodies the present invention. The foundation and supporting structure for the wind tunnel 11 forms no part of the present invention and is not shown or described In operation of the wind tunnel 11 the test medium, e.g. air, is stored in the supply tube 13 before testing and is held there by means of a diaphragm in the flow initiator 25 which may be similar to that disclosed in our U.S. Pat. No. 3,469,734. The test model is mounted in the proper orientation by a mounting mechanism in the model-mounting section 23 while the test model itself extends into the test section 15. When the burst diaphragm of the section 25 is broken the test medium gas is set in motion and subsequently the flow of gas through the test section 15 impinges on the test model therein and the gas moves on through the diffuser section 17 and is exhausted into the exhaust tank 19. The exhausting gas is muffled in the tank 19 and is gradually released from the tank into the atmosphere over a brief period of time.

The details of the test section 15 of the wind tunnel 11 which embodies the present invention will be described with reference to FIGS. 2 through 5. As shown in FIG. 2, the test section 15 comprises an exterior longitudinal tube 33 joined as by welding at the upstream end of the test section to a circular frame member 35. A the downstream end the tube 33 is similarly joined to a circular frame member 37. The frame member 37 has two sets of circumferentially spaced openings therein comprising outer openings 39 and inner openings 41. Overlying the outer portion of the frame member 37 is a ring 43 that has circumferentially space openings 45 that match in size and spacing the outer openings 39 in the frame member 37. The inner edge of the ring 43 is notched to fit against a projection 49 of the frame 37. The projection 49 forms a seat for the inner edge of the ring 43 and for the outer edges of a series of cover plates 51. The plates 51 each from an arc segment with each plate covering one of the openings 41 in the frame member 37. The outer edges of each of the plates 51 fit in a slot 53 in the projection 49 and the inner portion of the plates 51 are secured to the frame member 37 by screws 55 extending into the frame member 37.

The ring 43 is rotatable around its axis for a limited amount. Three recesses 57 are formed in the outer edge of the ring that form a seat for a flange 59 of three keepers 61 joined to the frame member 37 by screws 63. The recesses 57 are of a length that will permit clockwise or counterclockwise rotation of the ring 43 to completely cover or uncover the openings 39 in the frame member 37.

Rotation of the ring 43 is effected by a handwheel assembly comprising a handwheel 67 by which a shaft extension 69 may be rotated. The shaft extension 69 rotates and pivots in a stationary trunnion 71 anchored by screws 73 to the outside of the test section. The shaft 69 also rotates and pivots in a movable trunnion 75 that is anchored to a plate 77 which plate is in turn joined as by welding to the outer edge of the ring 43. The handcrank fits over the projecting end of the shaft extension 69 when it is desired to rotate the ring 43. When the shaft extension is turned the shaft moves longitudinally of the shaft in the stationary trunnion 71 by virtue of threaded engagement between the shaft extension 69 and the stationary trunnion 71. As the shaft extension moves longitudinally the ring 43 is rotated clockwise or counterclockwise by the force applied through the movable trunnion 75 and the associated plate 77. The rotational position of the ring 43 is indicated by ring position indicator 78 fixed to the outside of the frame member 37 and an index 79 fixed to the ring 43.

Spaced around the inside wall of the exterior tube 33 and abutting the frame member 37 are spaced gusset or stiffening angles 81. A reinforcing ring or rib 83 is provided on the exterior tube 33 near the upstream end thereof.

Mounted concentrically within the exterior tube 33 is a sleeve assembly comprising an outer sleeve 87 and an inner sleeve 89. Since the outside diameter of the sleeve 87 is substantially less than the inside diameter of the tube 33, a plenum chamber 90 is formed between the sleeve assembly and the tube 33. The inner sleeve 89 has slanted holes 91 therein and the outer sleeve 87 has slanted holes 93 therein (see FIGS.2, 4 and 5). The holes 91 and 93 in the sleeves are slanted at an angle of approximately 30° (FIG. 5) to the walls of the sleeves and are matched in size and spacing so that the holes may be perfectly registered to provide maximum open space through the sleeves or offset to provide minimum open space through the sleeves. As shown in FIG. 4, near the left or upstream end of the sleeves 87 and 89, the holes 91 and 93 are more widely spaced and gradually increase in number in a tapering pattern from left to right until a uniform closely spaced pattern is established over most of the length of the sleeves. The purpose of this tapering pattern of holes in the upstream region of the sleeves will be explained hereinafter.

The inner sleeve 89 at its right or downstream end has a thickened rim portion 97 which fits within the inside diameter of the circular frame 37. As shown in FIG. 2, screws 99 extend through the rim 97 and into the frame 37 to secure the sleeves within the exterior tube 33. The upstream end of the inner sleeve 89 extends into and fits within the inner diameter of the frame member 35 and the end of the outer sleeve 87 terminates in a chamfered or slanted portion 101 of the circular frame 35. A slot 103 is provided at the upstream end of the outer sleeve 87 and a slot 105 provided in the downstream end thereof. Pins 107 and 109 fixed to the inner sleeve 89 project into the slots 103 and 105, respectively, to provide a fixed alignment between the sleeve 87 and 89 to permit longitudinal shifting of the outer sleeve relative to the inner sleeve.

An electric linear actuator 113 is mounted at one end to the reinforcing ring 83 by a bracket 115 joined by screws 117 to the ring 83. The other end of the actuator is secured to the outer sleeve87 by a bracket 119 bearing on an annular thickened area 121, being joined by screws. By the actuator 113 the outer sleeve 87 may be shifted longitudinally to adjust the degree of offset between the slanted holes 91 and 93 in the sleeves and thereby adjust the open space through the sleeves.

A potentiometer, indicated schematically at 123, is mounted on the outer sleeve 87 for providing an indication on an external meter (not shown) of the relative position of the sleeves 87 and 89 and thus indicate the amount of porosity through the holes 91 and 93.

Stiffening plates 125 and stiffening angles 127 are circumferentially spaced around the tube 33 near the upstream end thereof as shown in FIG. 2. Flow liners 131 comprising blocks of wood or other appropriate material are positioned between the stiffening plates 125. The liners 131 reduce the amount of gas initially contained in the plenum chamber 90 prior to flow initiation so that the test-starting process can be ended in a minimum time. The filling of unused plenum space by the flow liners 131 also aids in obtaining a gas flow of uniform velocity through the plenum chamber during the test. Access openings 133 are provided on the top and sides of the test section. These openings are covered by plates 135 bearing on connecting flanges 137 with associated bolts 139.

OPERATION

When the test medium is flowing through the test section 15 during a short duration test the main flow stream is through the area defined by the sleeve assembly comprising sleeves 87 and 89. The body of the test model will be positioned as prescribed for the test in the main flow stream of the test section. The velocity of the test medium upon entering the test section 15 from the nozzle 21 will be in the subsonic range, - for example, as large as Mach number 0.8. The removal of gas from the main stream through the holes 91 and 93 and into the plenum chamber 90 and out through the downstream end of the plenum chamber lowers the gas pressure in the main flow stream of the test section and thereby raises the velocity of the main flow stream. This "sucking off" of gas from the main flow stream also removes the boundary layer that would otherwise develop on the wall of the test section and thereby tend to reduce the flow velocity.

As indicated in FIG. 1, the model-mounting section 23 immediately downstream of the test section 15 is greater in cross section than the test section. This permits the gas flowing out of the plenum chamber 90 of the test section 15 to immediately expand upon entering the model-mounting section 23. This arrangement causes a reduction in the gas pressure in the model-mounting section and results in an ejector-pumping effect of the gas out of the plenum chamber of the test section.

The flow of gas through the sleeves 87 and 89 is adjusted prior to the short duration test for optimum cancellation of shock and expansion waves that radiate from the test model when the test medium strikes the model. If these shock and expansion waves were permitted to reflect from the wall of the sleeve assembly back against the test model the aerodynamic simulation would be impaired Adjustment of the outer sleeve 87 relative to the inner sleeve 89 to get the optimum flow through the slanted holes 91 and 93 for a given test condition is effected by the linear actuator 113 which, as previously indicated, is adapted to slide the outer sleeve 87 longitudinally relative to the inner sleeve 89. the relative position of the sleeve 87 being indicated by the potentiometer 123. The rate of gas flow out of the downstream end of the plenum chamber 90 is also adjusted prior to the wind tunnel test by rotating the cover ring 43 with the handwheel 67 in the manner previously described.

The ratio of the thickness of the sleeves 87 and 89 and the diameter of the slanted holes 91 and 93 has been found to be of significance in the operation of the test section. Best results have been obtained if the ratio between the combined thickness of both the sleeves 87 and 89 and the diameter of the slanted holes 91 and 93 is within the range of 0.5 to 1.6.

The slant or inclination of the holes 91 and 93 minimize flow of the test medium from the plenum chamber back to the free stream. As noted previously, the plenum flow liners 131 help to reduce start time and maintain uniform flow conditions at all points in the test region. The tapered hole patterns in the upstream end of the sleeves 87 and 89 provide a gradual transition in flow velocity from the entrance or upstream end of the test section to the free stream velocity in the central region of the test section where the test model would be mounted.

When the test section is employed for tests in the subsonic Mach number range choking flaps (not shown) are provided in the upstream end of the test model mounting section 23 for adjusting the gas flow velocity to the subsonic range.

We claim:

1. A test section for a short duration wind tunnel comprising:
   a longitudinal tube defining an upstream end and a downstream end of said test section;
   a longitudinally extending sleeve assembly mounted concentrically in said tube forming the main flow stream through said test section;
   said sleeve assembly comprising an inner sleeve and an outer sleeve with the interior surface of said outer sleeve being contiguous with the exterior surface of said inner sleeve;
   the inside diameter of said tube being substantially greater than the outside diameter of said outer sleeve whereby an annular longitudinally extending plenum chamber is formed between said tube and said sleeve assembly;
   matching holes extending through the walls of said sleeves between said main flow stream and said plenum chamber;
   means for varying the degree of alignment and offset of said holes whereby the flow space between said main flow stream and said plenum chamber may be adjusted;
   a plurality of circumferentially spaced openings at the downstream end of said plenum chamber;
   means for adjusting the flow through said openings and thereby adjust the flow out of said plenum chamber at the downstream end of said test section.

2. The invention as defined in claim 1 wherein said means for adjusting the flow through said openings at the downstream end of said plenum chamber comprises a rotatable ring overlying said openings, said ring having a plurality of circumferentially spaced openings therethrough, means for rotating said ring whereby said openings in said ring may be moved to various degrees of alignment with said openings in said plenum chamber.

3. The invention as defined in claim 1 wherein said matching holes are less numerous near the upstream end of said sleeves than at the downstream end thereof, said holes gradually increasing in number over a portion of the upstream length of said sleeves.

4. The invention as defined in claim 1 wherein said plenum chamber is partially filled with flow liners near the upstream end of said test section.

5. The invention as defined in claim 1 wherein said matching holes in said sleeves are slanted from the inside of said sleeves to said plenum chamber toward the downstream end of said test section, the ratio between the combined wall thickness of both of said sleeves and the diameter of said holes being between 0.5 and 1.6.